United States Patent [19]

Face, Jr. et al.

[11] Patent Number: 4,473,960

[45] Date of Patent: Oct. 2, 1984

[54] SURFACE PROFILE MEASURING DEVICE

[75] Inventors: Samuel A. Face, Jr., Norfolk; Samuel A. Face, III, Newport News, both of Va.

[73] Assignee: The Edward W. Face Company, Incorporated, Norfolk, Va.

[21] Appl. No.: 470,761

[22] Filed: Feb. 28, 1983

Related U.S. Application Data

[63] Continuation-in-part of Ser. No. 303,714, Sep. 18, 1981, Pat. No. 4,434,558.

[51] Int. Cl.³ .............................................. G01C 9/06
[52] U.S. Cl. ...................................... 33/366; 33/189
[58] Field of Search .................... 33/174 R, 365, 366, 33/180 R, 174 P, 227, 300, 354, 189, 285, 286

[56] References Cited

U.S. PATENT DOCUMENTS

| | | | |
|---|---|---|---|
| 3,816,937 | 6/1974 | Burgin | 33/366 |
| 3,835,546 | 9/1974 | Jaquet | 33/338 |
| 3,897,637 | 8/1975 | Genho | 33/227 |
| 3,909,952 | 10/1975 | Lagasse | 33/286 |
| 4,302,962 | 12/1981 | Williams | 33/365 |

Primary Examiner—Willis Little
Attorney, Agent, or Firm—Harvey B. Jacobson

[57] ABSTRACT

A sensor mounted on a frame measures inclination of a sensitivity axis above two contact points on a surface on which the frame is positioned. The signal output of the sensor is converted to digital elevation readings of opposite polarity displayed through windows on opposite sides of a handle through which the frame is rotated about alternate contact points into measurement positions along a measurement line marked on the surface.

13 Claims, 7 Drawing Figures

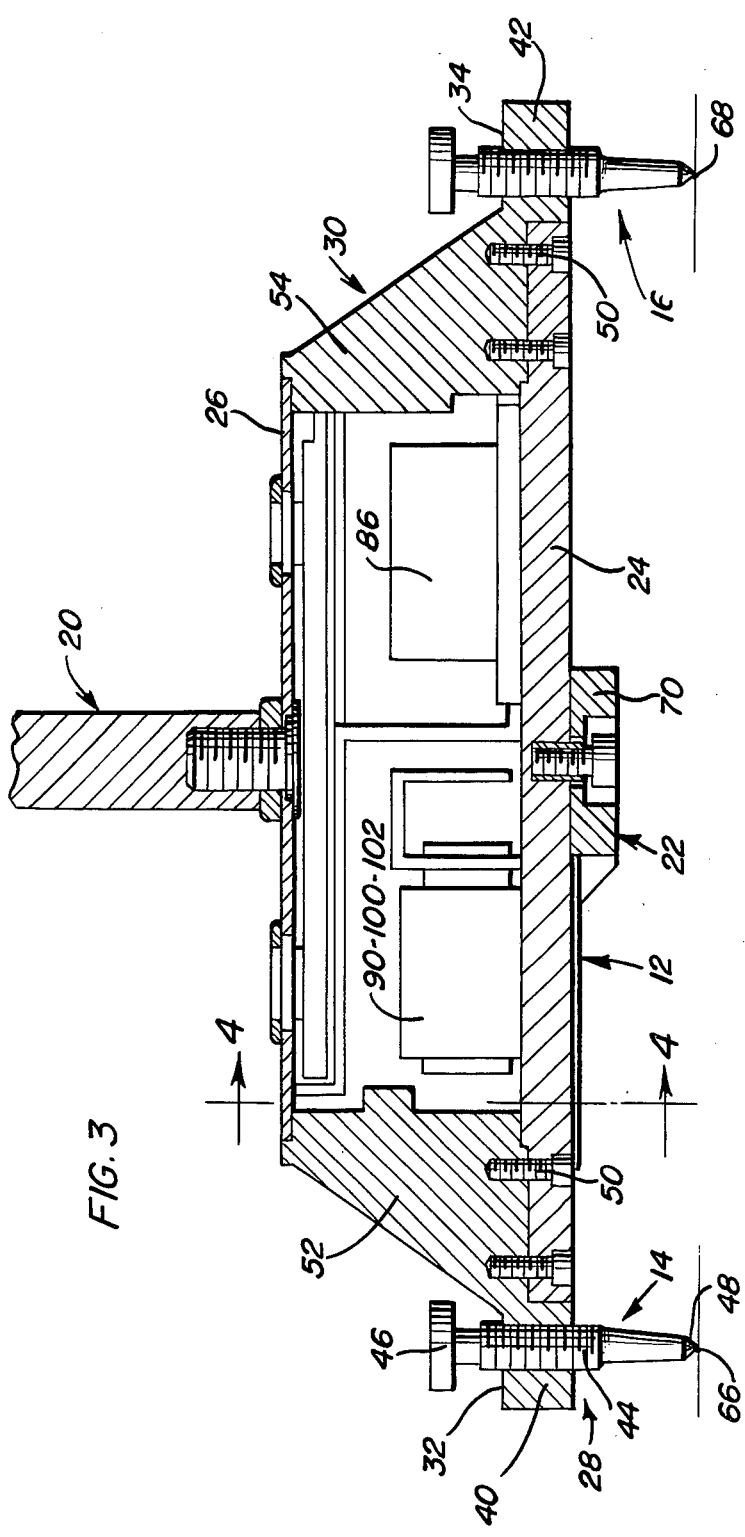
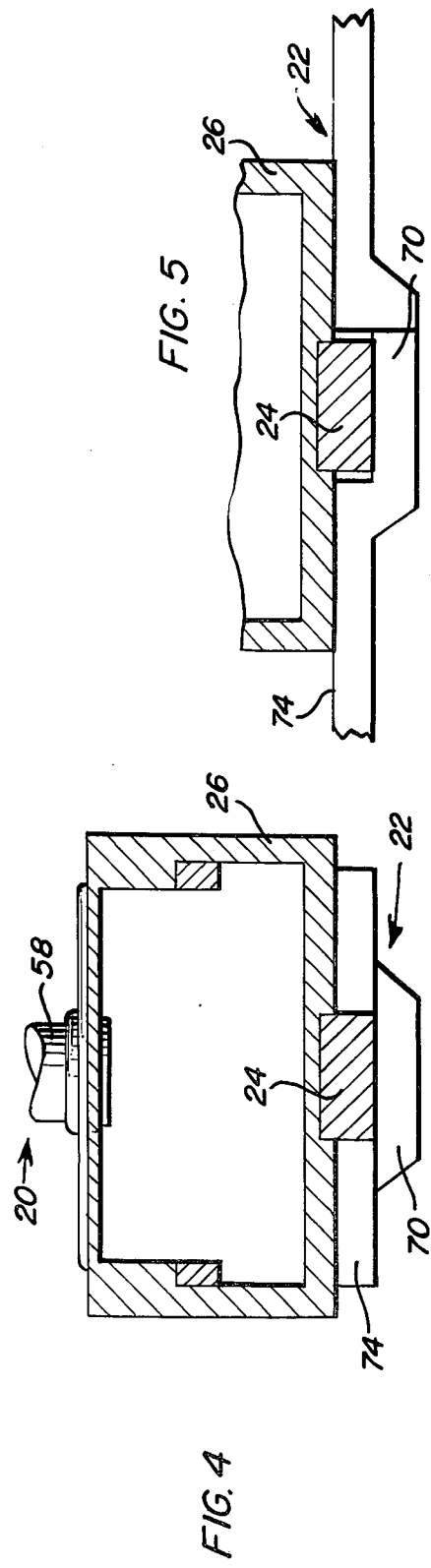
FIG. 3
FIG. 4
FIG. 5

1

SURFACE PROFILE MEASURING DEVICE

BACKGROUND OF THE INVENTION

This invention relates to the measurement of floor surface flatness, and features improvements to the apparatus disclosed in our prior copending application, Ser. No. 303,714, filed Sept. 18, 1981, now Pat. No. 4,434,558, issued Mar. 6, 1984, with respect to which the present application is a continuation-in-part.

According to our prior copending application, fast and accurate measurement of floor surface profiles is made possible to enhance compliance with floor surface flatness standards in the building industry. Thus, tolerance values and specification formats presently based on conjecture may be eliminated in favor of more realistically enforceable standards. Further, an effective tool is provided for quality control during construction.

It is an important object of the present invention to provide an improved floor profile measuring device to simplify readings and data collection in accordance with the measurement method disclosed in our prior copending application, the disclosure of which is herein incorporated by reference.

A further object in accordance with the preceding object is to provide an improved floor profile measuring device that is more compact to store, and more easily adjusted, repaired and maintained in operating condition.

SUMMARY OF THE INVENTION

In accordance with the present invention, an inclination sensor is mounted on a frame to a establish a common sensitivity axis parallel to a contact line segment between fixedly spaced contact points on a floor surface engaged at such contact points by contacting elements projecting from the frame. The contact points are equidistant from a coplanar vertical axis intersecting the contact line segment. The frame is rotatable by a handle assembly about alternate contact points through 180° arcs to "walk" the device along a measurement line marked on the floor surface in order to obtain elevation readings from two windowed displays, respectively located on either side of the handle corresponding to the underlying contact points, in a plurality of measurement positions of the device along the measurment line. A battery powered circuit converts the signal output of the sensor into digital elevation readings of opposite polarity on the displays, turned on by a control switch mounted at one end of the frame housing. A retractable tilt support mounted on the underside of the housing, is extended laterally to provide a tilt stand for the device on the floor surface while the device is not in use.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side sectional view taken substantially through a plane indicated by section line 3—3 in FIG. 1.

FIG. 4 is a transverse sectional view taken substantially through a plane indicated by section line 4—4 in FIG. 3.

FIG. 5 is a partial sectional view similar to that of FIG. 4, but showing the tilt support extended.

DESCRIPTION OF THE PREFERRED EMBODIMENT

Figure 1:
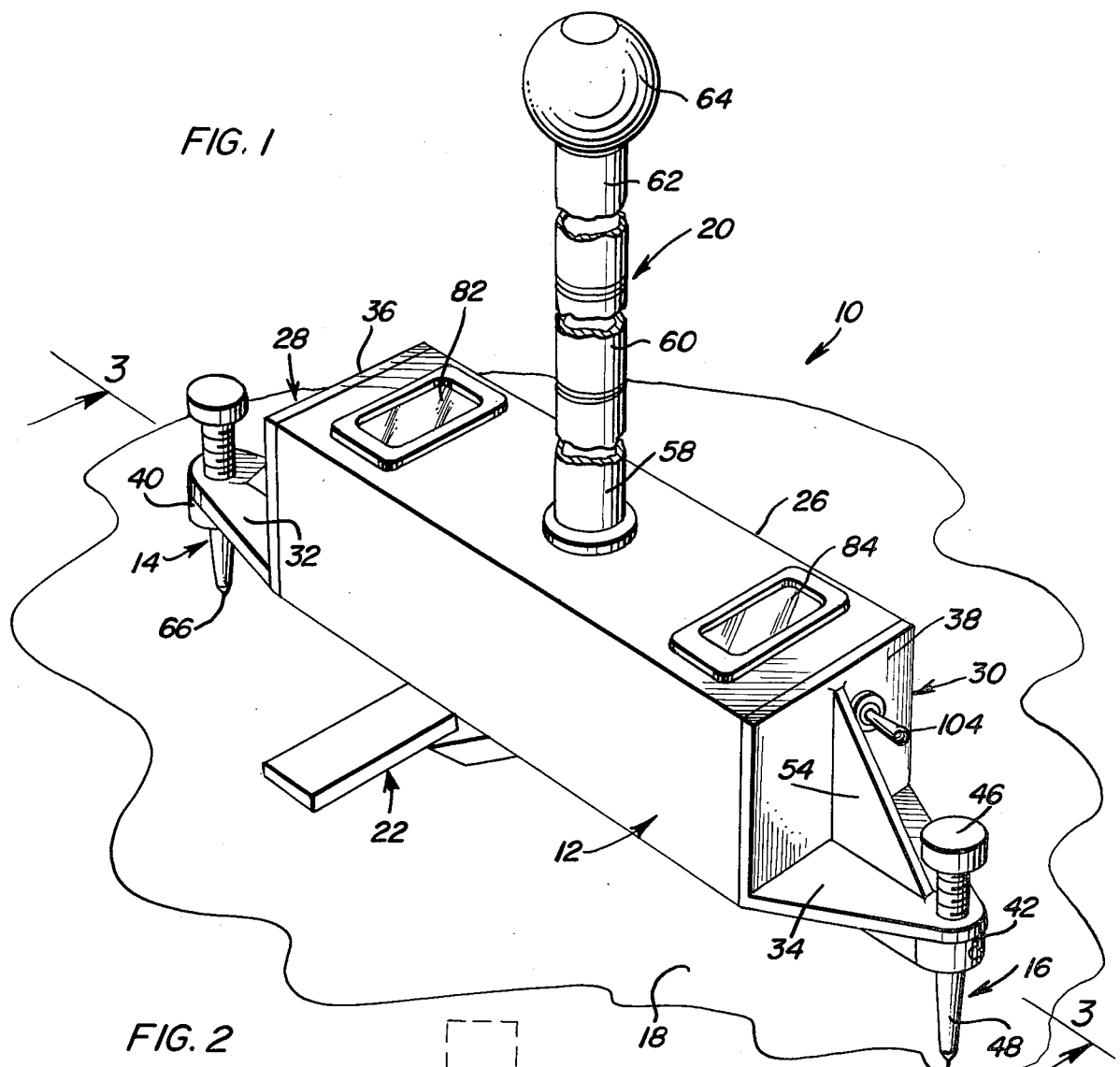
FIG. 1 is a perspective view of a device constructed in accordance with the present invention.

Referring now to the drawings in detail, FIG. 1 illustrates the improved surface profile measuring device of the present invention, generally referred to by reference numeral 10. The device comprises an elongated frame generally denoted as 12, mounting a pair of surface contacting elements 14 and 16 adapted to support the frame in spaced relation above a surface 18 to be measured for flatness. A vertically elongated handle assembly 20 is secured to the frame for rotation thereof through 180° arcs between measurement positions as described in detail in our prior copending application, aforementioned. A movably mounted tilt support, generally referred to by reference numeral 22, is extended from a retracted position to the laterally projecting position shown in FIG. 1, to provide three-point stabilized, temporary support for the device 10 on surface 18.

With reference to FIGS. 1-4, the frame 12 is formed by an elongated base bar 24, a tubular housing 26 of rectangular cross section, and a pair of end brackets 28 and 30. The end brackets have triangular leg portions 32 and 34 and end wall portions 36 and 38 at right angles thereto fitted into and closing the opposite open ends of the housing 26. The leg portions 32 and 34 extend longitudinally from the ends of the housing flush with the bottom thereof and are provided with internally threaded formation 40 and 42 within which the surface contacting elements 14 and 16 are mounted. Each element 14 and 16 includes an externally threaded portion 44 connected at its upper end to an adjustment knob 46 and at its lower end to a tapered surface contact portion 48. Thus, by rotation of either knob 46, the attitude of the frame 12 relative to surface 18 may be adjusted. The frame is maintained assembled by pairs of fasteners 50 as more clearly seen in FIG. 3 securing the end portions of bar 24, projecting beyond the housing 26, to the end brackets 28 and 30. Triangular reinforcing webs 52 and 54 interconnect the leg and end wall portions of the brackets.

Figure 2:
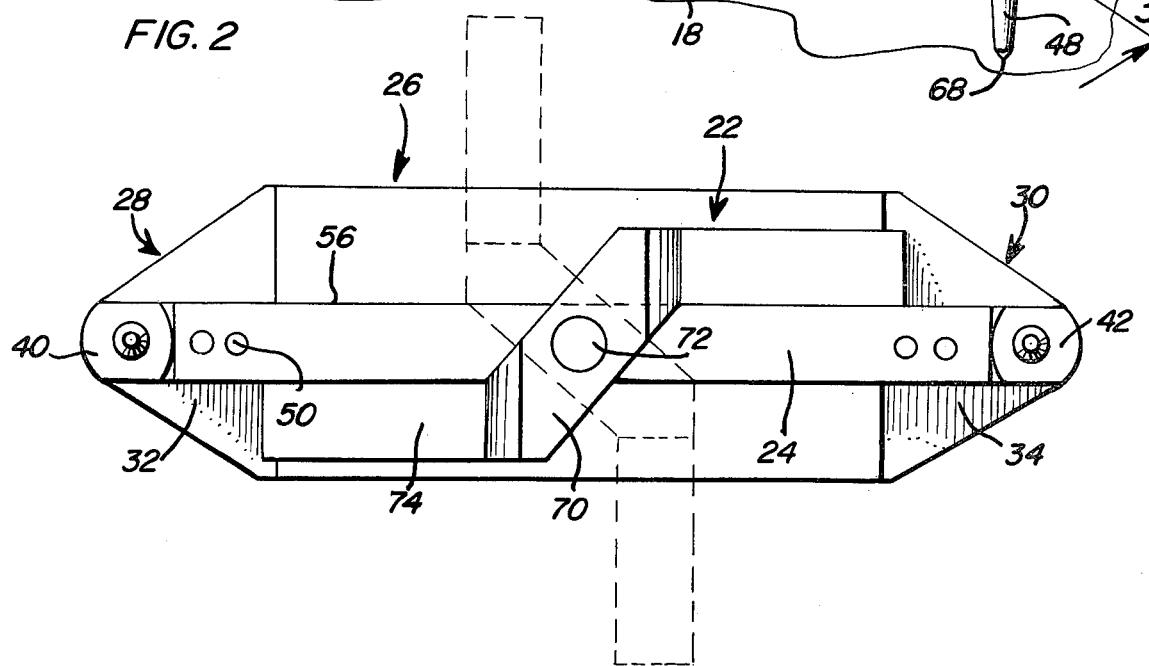
FIG. 2 is a bottom view of the device.

The end bracket 28 is removable to expose one open end of the housing 26 by removal of fasteners 50 from the corresponding end portion of bar 24 which fits within a recess 56 formed in the bottom of housing 26 as more clearly seen in FIG. 2. The ends of bar 24 abut the formations 40 and 42 on the end brackets when the frame is assembled as shown. Removal of end bracket 28 enables removal and/or insertion of components into the housing such as the batteries located adjacent thereto.

The handle assembly 20 includes a lower cylindrical section 58 secured to the top of the housing 26 midway between its opposite ends. The section 58 is threadedly connected through an intermediate section 60 to an upper section 62, to which a spherical knob 64 is threadedly connected. The handle assembly may accordingly be disassembled for compact storing purposes, but more importantly enables the user to rotate the frame about one of the contact points 66 and 68 of the surface contacting elements 14 and 16.

The support 22 aforementioned, includes a central hub portion 70 connected by pivot 72 as shown in FIG. 2 to the bar 24 of the frame for angular displacement relative to the frame about the vertical axis extending through the handle assembly 20. Opposite tilt legs 74 extend from the hub portion on either side of bar 24 against which the legs abut in a retracted position of the tilt support as shown by solid line in FIG. 2. The support is pivotally displaced from the retracted position to an extended position projecting laterally from the frame as shown by dotted line in FIG. 2 and as shown in FIGS. 1 and 5. When so extended, the legs 74 of the support will provide tilted support for the device on surface 18.

Figure 6:
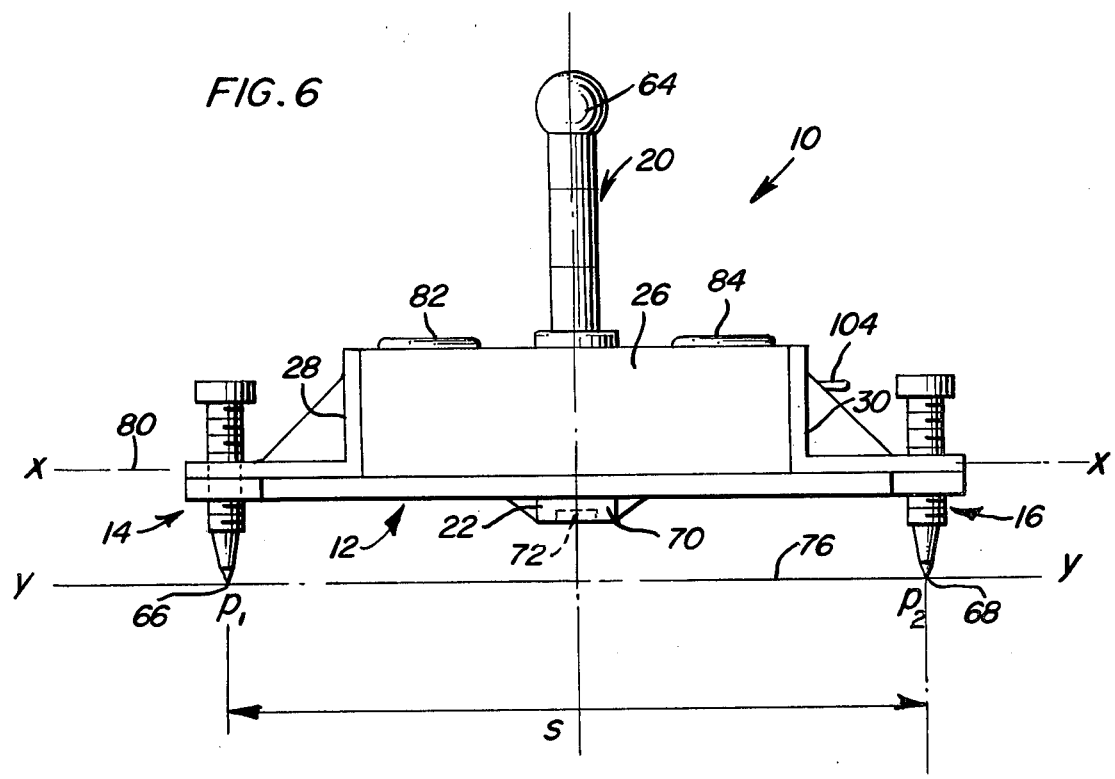
FIG. 6 is a side elevational view of the device showing certain geometrical relationships.

For surface measuring purposes, the frame 12 is held by means of handle assembly 20 in a position supported only at contact points 66 and 68 to establish a contact line segment 76 intersected by and perpendicular to the vertical axis 78 through handle assembly 20 and pivot 72 as diagrammed in FIG. 6. The contact points 66 and 68 are furthermore equidistant from the intersection of line 76 and axis 78 and are in a common plane with axis 78. As also shown in FIG. 6, by rotation of either knob 46 contact line 76 has been adjusted parallel to an inclination sensing axis 80 of a sensor, such as a slope accelerometer 86 mounted within the housing 26 as shown in FIG. 3 Digital elevation readouts of opposite polarity corresponding to measurements made by the sensor 86 are displayed through windows 82 and 84 mounted on top of the housing on either side of the handle assembly.

Figure 7:
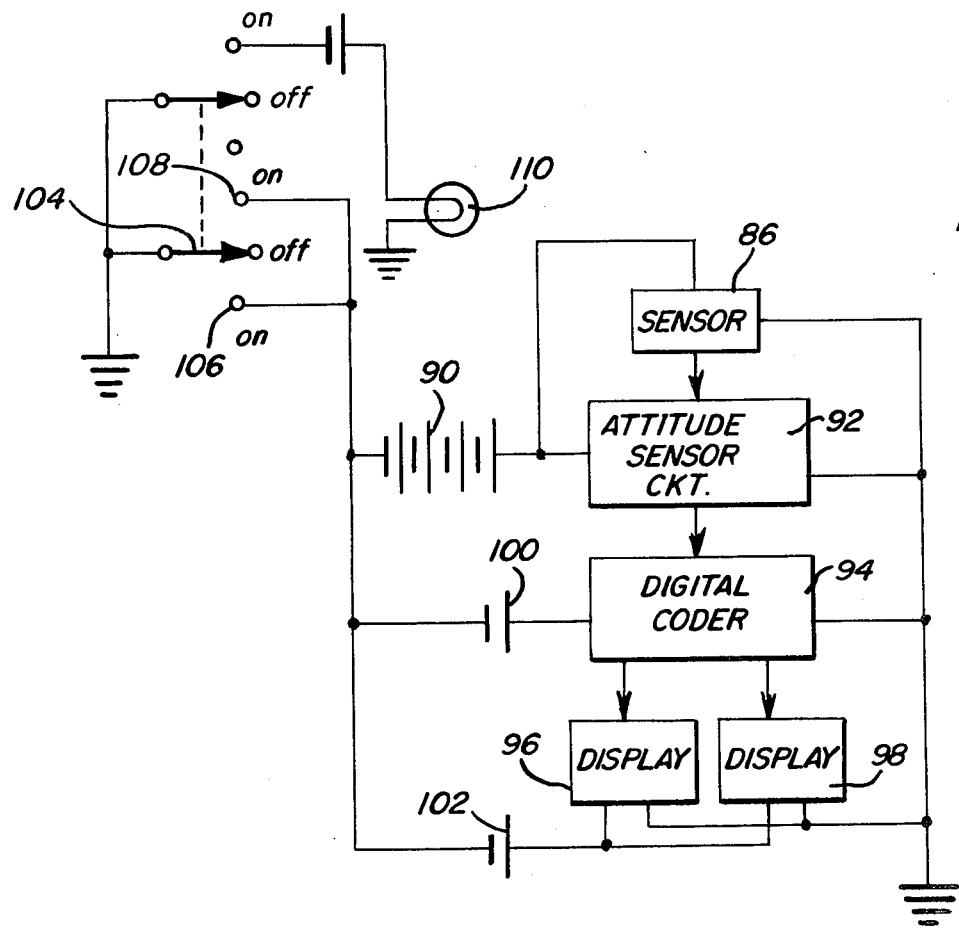
FIG. 7 is a simplified electrical circuit diagram corresponding to the measurement components of the device.

FIG. 7 diagrammatically shows the components enclosed within housing 26 including the sensor 86 energized by a battery source 90. A measurement signal from the sensor is fed to an attitude circuit 92 also powered by batteries 90 to convert such signal into a corresponding elevation output which is processed by a digital coder 94 to produce digital readouts of equal magnitude and opposite polarity in windows 82 and 84 through the displays 96 and 98. Batteries 100 and 102 respectively power the coder 94 and displays. A three position control switch 104 is provided which may be locked in an "off" position and is mounted on the end bracket 30 as shown. The switch 104 may be of a toggle type, pulled out to release it from its locked position for displacement to one of two "on" positions denoted by contacts 106 and 108 in FIG. 7. In each of the "on" positions, battery circuits are completed to enable measurement operation of the device 10. In the "on" position wherein switch 104 engages contact 108, a panel lamp 110 is also energized to illuminate the display readouts in windows 82 and 84.

The device 10 is utilized by "walking" it along a marked line on the surface being measured between point locations as described in our prior copending application. However, elevations readings are alternately taken from one of the two displays 96 and 98 adjacent to the surface contacting element 14 and 16 at which a measurement is being made. The readings will thus alternate between the two displays for successive point locations along the measurement line marked on the surface. The displays are designed to exhibit a plus (+) or a minus (−) sign preceding each reading to designate elevation above (+) or below (−) the contact point of the other surface contacting element. Thus, the readings obtained by the data collecting procedure described, are recorded and simply added to calculate elevation values for each point location on the measurement line from which a profileograph may be plotted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a device for measuring flatness of a surface, a rigid frame, a pair of surface contact elements projecting from the frame in spaced relation to each other, a handle connected to the frame and extending therefrom along a vertical axis coplanar with spaced contact points on the surface at which the surface contacting elements engage the surface, sensing means mounted on the frame for measuring inclination thereof relative to each of said contact points, and display means operatively connected to the sensing means for indicating relative elevation of each of said spaced contact points, said display means including a pair of indicator windows on either side of said vertical axis exhibiting elevation readings corresponding to the contact points respectively associated with adjacent ones of the surface contacting elements.

2. The device as defined in claim 1 wherein said vertical axis is perpendicular to and intersects a contact line segment interconnecting the spaced contact points.

3. The device as defined in claim 2 wherein said sensing means includes a slope accelerometer having a sensitivity axis substantially parallel to said contact line segment and coplanar with the vertical axis.

4. The device as defined in claim 3 wherein said frame includes an elongated base bar, a housing fixed to the base bar enclosing the sensing means, and end bracket means secured to the base bar for closing the housing and supporting the surface contacting elements.

5. The device as defined in claim 4 including support means movably mounted on the base bar of the frame for displacement between a retracted position below the housing and an extended position projecting laterally therefrom.

6. In a device for measuring flatness of a surface, a rigid frame, a pair of surfaces contact elements projecting from the frame in spaced relation to each other, a handle connected to the frame and extending therefrom along a vertical axis coplanar with spaced contact points on the surface at which the surface contacting elements engage the surface, sensing means mounted on the frame for measuring inclination thereof relative to each of said contact points, display means operatively connected to the sensing means for indicating relative elevation of each of said spaced contact points, said frame including an elongated base bar, a housing fixed to the base bar enclosing the sensing means, and end bracket means secured to the base bar for closing the housing, and support means movably mounted on the base bar of the frame for displacement between a retracted position below the housing and an extended position projecting laterally therefrom.

7. In a device for measuring flatness of a surface, a rigid frame, a pair of surface contact elements projecting from the frame in spaced relation to each other, a handle connected to the frame and extending therefrom along a vertical axis coplanar with spaced contact points on the surface at which the surface contacting elements engage the surface, sensing means mounted on the frame for measuring inclination thereof relative to each of said contact points, display means operatively connected to the sensing means for indicating relative elevation of each of said spaced contact points, said vertical axis being perpendicular to and intersecting a contact line segment interconnecting the spaced contact points, and elongated support means movably mounted on the frame for displacement between a retracted position substantially parallel to said contact line and an extended position projecting from the frame laterally of the contact line segment.

8. In a device for measuring flatness of a surface, a rigid frame, a pair of surface contact elements projecting from the frame in spaced relation to each other, a handle connected to the frame along a vertical axis coplanar with spaced contact points on the surface at which the surface contacting elements engage the surface, sensing means mounted on the frame for measuring inclination of a line segment interconnecting said contact points relative to each of said contact points, and elongated support means movably mounted on the frame for displacement between a retracted position substantially parallel to said line segment and an extended position projecting from the frame laterally of the line segment.

9. The device as defined in claim 8 wherein said vertical axis is perpendicular to and intersects the line segment between the spaced contact points.

10. The device as defined in claim 9 wherein said sensing means includes a slope accelerometer having a sensitivity axis substantially parallel to said line segment.

11. In a device for measuring flatness of a surface, a rigid frame, a pair of surface contacting elements projecting from the frame in spaced relation to each other and adapted to rest at spaced contact points on the surface, a handle connected to the frame along a vertical axis coplanar with said spaced contact points on the surface at which the surface contacting elements engage the surface, and sensing means mounted on the frame for measuring inclination of said contact points relative to each other, said vertical axis being perpendicular to and intersecting a contact line segment interconnecting the contact points, and display means operatively connected to the sensing means for indicating relative elevation of each of said spaced contact points.

12. The device as defined in claim 11 wherein said sensing means includes a slope accelerometer having a sensitivity axis substantially parallel to said contact line segment and coplanar with the vertical axis.

13. The device as defined in claim 11 wherein said frame includes an elongated base bar, a housing fixed to the base bar enclosing the sensing means, and end bracket means secured to the base bar for closing the housing and supporting the surface contacting elements.

* * * * *